3,190,892
ORGANIC GERMANIUM-PHOSPHORUS
COMPOUNDS
George A. Richardson and Gail H. Birum, Dayton, Ohio, assignors to Monsanto Company, a corporation of Delaware
No Drawing. Filed July 29, 1960, Ser. No. 43,981
15 Claims. (Cl. 260—347.8)

The present invention relates to new organic compounds containing both germanium and phosphorus.

It is an object of this invention to provide new and useful germanium compounds containing phosphinylhydrocarbyloxy radicals. It is a further object of this invention to provide methods for making germanium compounds containing phosphinylhydrocarbyloxy radicals. These and other objects will become apparent as the description of the invention progresses.

In general, this invention is directed to tetravalent germanium compounds containing from one to four phosphinylhydrocarbyloxy radicals, i.e., radicals of the type

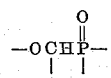

wherein the indicated free valences of the oxygen, carbon, and phosphorus atoms are satisfied as indicated herein. These compounds may be prepared, according to the method of this invention, by reacting a tetravalent germanium compound having from 1 to 4 halogen atoms selected from the group consisting of bromine and chlorine bonded to the germanium atom, with an aldehyde and a trivalent phosphorus ester having at least one alkoxy or halogen-substituted alkoxy radical bonded to the phosphorus atom. During the course of this reaction the trivalent phosphorus atom of the phosphorus ester is converted to the pentavalent state, gives up one alkyl or halogen-substituted alkyl radical, and becomes bonded to the carbonyl carbon atom of the aldehyde thus forming a phosphinylhydrocarbyloxy radical which replaces a bromine or chlorine atom attached to the germanium atom. The alkyl or halogen-substituted alkyl radical given up by the phosphorus ester reactant and the bromine or chlorine atom given up by the germanium compound form an alkyl or haloalkyl bromide or chloride compound which is a by-product. Alternatively, the compounds of this invention may be prepared by another method which involves the reaction of a tetravalent germanium compound containing at least one bromine or chlorine atom bonded to the germanium atom with an α-hydroxyhydrocarbylphosphorus ester in the presence of a basic material.

More specifically, this invention provides compounds having the general formula

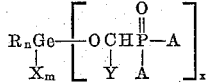

where $n$ is a whole number from 0 to 3, $m$ is a whole number from 0 to 3, $x$ is a whole number from 1 to 4, and the sum total of $n+m+x$ is always equal to 4; R is selected from the group consisting of hydrogen, and hydrocarbyl, halohydrocarbyl, hydrocarbyloxy, halohydrocarbyloxy, hydrocarbylthio, and halohydrocarbylthio radicals having from 1 to 20 carbon atoms, preferably from 1 to 12 carbons, and which may be saturated or unsaturated, and wherein two R's taken together stand for bivalent hydrocarbylene radicals of from 4 to 6 carbon atoms or -O-hydrocarbylene-O-radicals having from 2 to 4 carbon atoms in the ring and a total of from 2 to 12 carbon atoms; X is bromine or chlorine; Y is selected from the group consisting of hydrogen and hydrocarbyl radicals of from 1 to 12 carbon atoms, furyl and thienyl radicals and said radicals carrying a substituent selected from the group consisting of halogen, cyano-, -alkyl, -O-alkyl, -S-alkyl, and -COO-alkyl, where alkyl has from 1 to 5 carbon atoms when $n$ is 0 to 1, and when $n$ is 2 to 3, Y is selected from the group consisting of hydrogen, and hydrocarbyl radicals of from 1 to 17 carbon atoms, furyl and thienyl radicals, and said radicals carrying a substituent selected from the group consisting of halogen, cyano, -alkyl, -O-alkyl, -S-alkyl, and -COO-alkyl where alkyl has from 1 to 5 carbon atoms; and each A is selected from the group consisting of hydrocarbyl, hydrocarbyloxy, halohydrocarbyl, and halohydrocarbyloxy radicals having from 1 to 20 carbon atoms each, preferably from 1 to 12 carbon atoms. The hydrocarbyl, hydrocarbyloxy, hydrocarbylthio radicals and such radicals carrying halogen substituents, including fluorine-, bromine-, chlorine-, and iodine-substituted radicals attached to the germanium and phosphorus atoms include aliphatic and aromatic radicals which may contain olefinic or acetylenic unsaturation.

In this specification, the symbol T as used in a chemical formula represents the alkyl or haloalkyl radical having from 1 to 20 carbon atoms, and is derived from the trivalent phosphorus ester used in the reaction to prepare the compounds of this invention, and represents the alkyl or haloalkyl portion of the alkyl or haloalkyl halide by-product of the reaction.

The preferred method for preparing the compounds of this invention involves the reaction of a tetravalent germanium compound having from 1 to 4 bromine or chlorine atoms bonded to the germanium atom, an aldehyde, and a trivalent phosphorus ester which has at least one alkoxy or haloalkoxy radical bonded to the phosphorus atom. The product obtained will depend upon the molar proportions of the reactants used, i.e., the number of phosphinylhydrocarbyloxy groups present in the compounds of the invention depends upon the number of halogen atoms attached to the germanium atom in the halogen-containing germanium reactant which are replaced. When only one halogen is thus attached, a product containing one phosphinylhydrocarbyloxy group is obtained as follows:

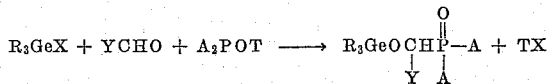

When two halogen atoms are attached to the germanium atom, they can both be replaced by using two moles each of the aldehyde and trivalent phosphorus ester. Thus, the reaction may be:

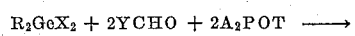
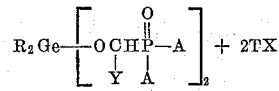

wherein the product contains two phosphinylhydrocarbyloxy groups, or by using only one molar proportion each of carbonyl compound and a trivalent phosphorus ester, the reaction may be as follows:

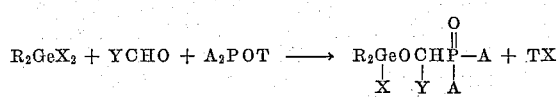

wherein the product contains one halogen attached to the germanium atom and one phosphinylhydrocarbyloxy group. When three halogen atoms are attached to the germanium atom, all three may react as follows:

RGeX₃ + 3YCHO + 3A₂POT ⟶

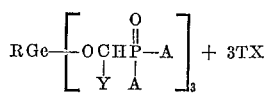

where the product contains three phosphinylhydrocarbyloxy groups, or the reaction may be limited to replacement of two halogen atoms:

RGeX₃ + 2YCHO + 2A₂POT ⟶

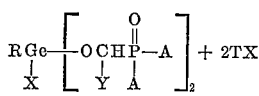

to give a product containing one halogen atom attached to the germanium atom and two phosphinylhydrocarbyloxy groups, or to replacement of one halogen atom,

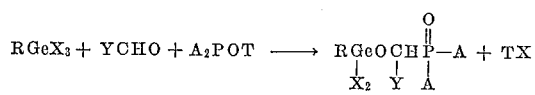

to give a product containing two halogen atoms attached to the germanium atom, and one phosphinylhydrocarbyloxy group, each reaction being accomplished by controlling the molar proportions of aldehyde and trivalent phosphorus ester that are used to replace the halogen atoms. When four halogen atoms are attached to the germanium atom, the reaction can be:

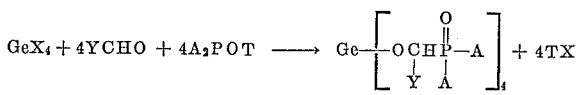

where the product contains four phosphinylhydrocarbyloxy groups. Or the reaction can be controlled to obtain products having only one, two or three of the halogens attached to the germanium atom replaced as in the above cases by controlling the molar proportions of aldehyde and trivalent phosphorus ester used. For example,

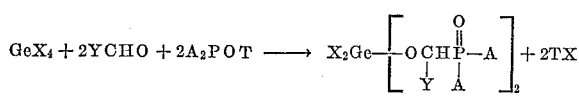

wherein the product has two halogens and two phosphinylhydrocarbyloxy groups.

Among the germanium halide reactants that can be used in this invention are compounds covered by the following general formulae:

| | |
|---|---|
| GeX₄ | (R′S)(XR′)GeX₂ |
| R′GeX₃ | R′(XR′O)GeX₂ |
| R′OGeX₃ | R′(XR′S)GeX₂ |
| R′SGeX₃ | R′O(XR′S)GeX₂ |
| XR′GeX₃ | R′O(XR′O)GeX₂ |
| XR′OGeX₃ | (R′S)(XR′S)GeX₂ |
| XR′SGeX₃ | R′₃GeX |
| R′₂GeX₂ | (R′O)₃GeX |
| (R′O)₂GeX₂ | (R′S)₃GeX |
| (R′S)₂GeX₂ | R′₂(R′O)GeX |
| R′(R′O)GeX₂ | R′₂(R′S)GeX |
| R′(R′S)GeX₂ | R′(R′O)₂GeX |
| (R′O)(R′S)GeX₂ | R′(R′S)₂GeX |
| (XR′)₂GeX₂ | R′(R′O)(R′S)GeX |
| (XR′O)₂GeX₂ | R′(R′O)₂(R′S)GeX |
| R′(XR′)GeX₂ | R′₂(XR′)GeX |
| (R′O)(XR′)GeX₂ | (R′O)₂(XR′O)GeX | where R′ represents hydrocarbyl radicals of from 1 to 20 carbon atoms, XR′ represents halohydrocarbyl radicals of from 1 to 20 carbon atoms, and X represents a halogen. The hydrocarbyl radicals may be aliphatic or aromatic; they may be saturated or unsaturated. Examples of hydrocarbyl radicals included in the above definition are alkyl, alkenyl, alkynyl, cycloalkyl, aryl, alkaryl, aralkyl, and their halogen derivatives. The above list of germanium halide reactants is not exhaustive of all variations but is intended only to show how the germanium valences may be satisfied for use in this invention.

Compounds of the formula

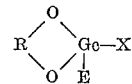

wherein R is a bivalent-hydrocarbylene radical selected from the group consisting of alkylene radicals of from 2 to 4 carbons in the ring and a total of from 2 to 12 carbon atoms, and arylene radicals of from 6 to 12 carbons having bonds of adjacent carbon atoms in the aryl ring attached to the oxygen atoms, and halogen substitution products thereof, E is a radical selected from the group consisting of hydrogen, R′, R′O, R′S, XR′O, XR′S defined earlier in the specification, and X is bromine or chlorine, may also be used as the germanium halide reactant.

Other useful germanium halide reactants include cyclic compounds of the formula

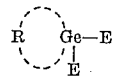

where R is a bivalent hydrocarbylene radical selected from the group consisting of alkylene radicals of from 4 to 6 carbon atoms in the ring and a total of from 4 to 12 carbon atoms, E is a radical selected from the group consisting of hydrogen, R′, R′O, R′S, XR′, XR′S defined earlier in the specification, and X is bromine or chlorine.

Examples of the germanium halides of the formula GeX₄ that can be used in the present invention are germanium tetrabromide, germanium tetrachloride and the bromochlorogermanes.

Examples of compounds of the formula RGeX₃ which are useful in this invention are tribromo- and trichlorogermanes and any of the following: methyl-, ethyl- n-propyl-, isopropyl- n-butyl-, isobutyl-, amyl-, isoamyl-, n-hexyl-, n-heptyl-, decyl-, undecyl-, 2-ethylhexyl-, propenyl-, hexenyl-, vinyl-, allyl-, 4-heptenyl-, propynyl, heptynyl-, decynyl-, cyclopentyltribromo- or -trichlorogermanes and such radicals substituted with one or more atoms of halogen.

Examples of the presently useful alkoxy, alkenyloxy, alkynyloxy, haloalkyloxy, haloalkenyloxy, and haloalkynyloxytrihalogermanes are methoxy-, ethoxy-, vinyloxy-, n-propoxy-, isopropoxy-, allyloxy-, propynyloxy-, n-butyoxy-, isobutoxy-, tert-butoxy-, 2-butenyloxy-, amyloxy-, isoamyloxy-, n-hexyloxy-, 5-hexenyloxy-, n-heptyloxy-, n-heptynyloxy-, n-octyloxy-, 2-ethylhexyloxy-, isononyloxy-, n-decyloxy-, n-undecyloxy-, n-dodecyloxy-, 11-dodecenyloxy-, 2-chloroethoxy-, 5-chloro-2-pentynyloxy-, 2-fluoroethoxy-, tetrachlorobutoxy-, 2-chloropropoxy-, 5-chloropentyloxy-, tribromopropoxy-, 2-iodopropoxy-, dichlorododecyloxy-, 6,6-dichloro-7-octenyloxy- or trichlorohexyloxytrichloro- or -tribromogermanes.

Examples of the presently useful cycloalkyl or halocycloalkyltrichlorogermanes are cyclohexyl-, cyclopentyl-, 2-methylcyclopentyl-, 4-isopropylcyclohexyl-, 2,4-dichlorocyclopentyl-, 2-bromocyclohexyl-, 2-fluorocyclopentyl-, 2-iodo-4-methylcyclohexyl-, or tetrachlorocyclohexyltrichloro- and -tribromogermanes.

Examples of the benzenoid trihalogermanes useful in this invention are phenyl-, α- or β-naphthyl-, 4-biphenylyl-, o-, m-, or p-tolyl-, p-ethylphenyl-, dibutylphenyl-, mesityl-, cymyl-, o-, m-, or p-pentylphenyl-, benzyl-, 2-phenylethyl-, 4-isopropylbenzyl-, or α-naphthylmethyltrichloro and -tribromogermanes.

Compounds of the formula R′SGeX₃ are hydrocarbylthiotrihalogermanes and halohydrocarbylthiotrihalogermanes in which the hydrocarbyl group is as defined above. Such compounds are, e.g., the alkylthio-, alkenylthio-, and alkynylthiotrihalogermanes such as ethylthio-, 2- pentenylthio-, 4-octynylthio-, n-butylthio-, or 2-ethylhexylthiotrichloro- or -tribromogermanes; the cycloalkylthioesters such as cyclihexylthio-, 2-methylcyclopentylthio, or 2,4-dimethylcyclohexylthiotrichloro- or -tribromogermanes; the haloalkyl-, haloalkenyl-, haloalkynyl-, or halocycloalkylthioesters such as 2-chloroethylthio-, 3-iodopropylthio-, 3,3-dibromopropylthio-, 2-fluoroethylthio-, 6-chloro-3-hexylthio-, 8,8,8-trichlorooctylthio-, 10-bromo-8-dodecynylthio-, 6-bromododecylthio-, 2-chlorocyclohexyl- or tribromocyclopentyltrichloro- or -tribromogermanes. The benzenoidthiotrihalogermanes such as phenyltriotrichloro- or -tribromogermanes, β-ethyl-2-naphthylthiotrichlorogermane, benzylthiotribromogermane, 4-biphenylthiotrichlorogermane, etc. may also be used.

The benzenoidoxy- or -thiotrihalogermanes may contain one or more halogen substituents in either the aromatic ring thereof, at an aliphatic group which is attached to the aromatic ring, or at both the aromatic ring and said aliphatic group. Examples of such halogen-substituted compounds are 2-, 3-, and 4-chlorophenylthiotrichlorogermanes, 3,4,5- or 2,3,4-trichlorophenylthiotrichlorogermane, pentachlorophenylthiotribromogermanes, β-bromo-naphthylthiotribromogermane, 4-(trifluoromethyl)phenylthiotrichlorogermane, p - chlorobenzylthiotribromogermane, 4-(iodophenyl)phenylthiotrichlorogermane and octachlorobiphenylthiotrichlorogermane.

Compounds of the formulae R'₂GeX₂, R'(R'O)GeX₂, R'(R'S)GeX₂, (R'O)₂GeX₂, (R'S)₂GeX₂, and R'S(R'O)GeX₂ in which R' is as defined above in detail for compounds of the formulae R'GeX₃, R'OGeX₃, and R'SGeX₃ may also be used in this invention. A few examples of such compounds are dihydrocarbyl or bis(halohydrocarbyl)-dichloro- or -dibromogermanes, dihydrocarbyloxy- or bis(halohydrocarbyloxy)dichloro- or -dibromogermanes, and the dihydrocarbylthio- or bis(halohydrocarbylthio)dichloro- or -dibromogermanes.

A few examples of aliphatic dihalogermanes which are suited for the present purpose are dihydrocarbyl- and the dihydrocarbyloxydichloro- and -dibromogermanes, compounds of the formulae, (Alkyl)₂GeX₂
(Alkyl-O)₂GeX₂
Alkenyl)₂GeX₂
(Alkenyl-O)₂GeX₂
(Alkynyl)₂GeX₂
(Alkynyl-O)₂GeX₂ in which the alkyl, alkenyl, and alkynyl radicals have from 1 to 12 carbon atoms and X is chlorine or bromine. For example, dimethyl-, diethyl-, diisopropyl-, bis(2-propynyl)-, di-n-butyl-, dimethoxy-, diethoxy-, diisopropoxy-, bis(2-propynyloxy)-, di-n-butyloxy-, di-tert-butyl-, di-n-amyl-, diisoamyl-, di-tert-butoxy-, di-n-amyloxy-, diisoamyloxy-, di-n-hexyl-, bis(2-hexenyl)-, di-n-heptyl-, bis(2-ethylhexyl)-, di-n-hexyloxy-, bis(2-hexenyloxy)-, di-n-heptyloxy-, bis(2-ethylhexyloxy)-, di-n-octyl-, diisononyl-, bis(9-nonyl)-, di-n-octyloxy-, diisononyloxy-, bis(9-nonyloxy)-, di-n-decyl-, di-n-undecyl-, di-n-dodecyl-, di-tert-dodecyl-, di-n-decyloxy-, di-n-undecyloxy-, di-n-dodecyloxy-, or di-tert-dodecyloxydichloro- or -dibromogermanes or the mixed esters such as propylbutoxydichlorogermane, ethoxymethoxydichlorogermane, n-octyloxy-n-propoxydibromogermane, hexylhexyloxydichlorogermane, tert-amyloxy-n-dodecyloxydichlorogermane, 3-butenyloxyhexyloxybromochlorogermane, etc., may be used.

The dialkyl-, dialkyloxy-, dialkenyl-, dialkenyloxy-, dialkynyl- and dialkynyloxydichloro- and -dibromogermanes may contain one or more halogen atoms in the respective carbon-containing radicals. Examples of such compounds are the simple esters such as bis (2-chloropropyl)-, bis(2-chloroethoxy)-, bis(2-bromopropyl)-, bis(3-bromopropoxy)-, bis(6-chloro-2-hexenyl)-, bis(6-chloro-2-hexenyloxy)-, bis(2-chloroheptyl)-, bis(4,4-dichlorooctyloxy)-, bis(2-fluoroethoxy)-, bis-(2,4-dibromo-5-heptynyloxy)-, or bis(2-bromo-2-chloroethoxy)dichloro or -dibromogermanes, and the mixed esters of both paraffinic and haloparaffinic alcohols such as (3-chloropropyl)ethyldibromogermane, (2-chloroethoxy)methoxydichlorogermane, or (2-chloropropoxy)ethoxydibromogermane.

The corresponding dialkylthio-, dialkenylthio-, and dialkynylthiodihalogermanes which are presently useful are compounds of the formulae (Alkyl-S)₂GeX₂
(Alkenyl-S)₂GeX₂
(Alkynyl-S)₂GeX₂ wherein alkyl, alkenyl, and alkynyl and X are as defined above. Such compounds are, e.g., bis(methylthio)-, bis-(ethylthio)-, bis(n-butylthio)-, bis(4-pentenylthio)-, bis-(2 - ethylhexylthio)-, bis(dodecylthio)-, bis(2-propynylthio), ethylthiomethylthio-, methylthio-n-octylthio-, or isopropylthiomethylthiodichloro- or -dibromogermanes. Examples of the presently useful simple or mixed haloalkylthioesters are bis(2-chloroethylthio)-, bis(3-fluoropropylthio)-, bis(4,4 - dichloro - 3 - pentenylthio)-, or methylthiotrichlorobutylthiodichloro- or -dibromogermanes.

A few examples of aromatic dihydrocarbyl germanium halides useful in the present invention are: diphenyl-, di-p-tolyl-, di-o-, m-, or p-xylyl-, dimesityl-, dibiphenylyl-, phenylnaphthyl-, phenylbenzyl-, (4-ethylphenyl)-p-tolyldichloro- and -dibromogermanes.

A class of aromatic germanium halides which are suited for the present purpose are the benzenoid dihydrocarbyloxydihalogermanes, i.e., compounds of the formula (Ar—O)₂GeX₂ in which Ar is a benzenoid hydrocarbyl radical which contains from 6 to 20 carbon atoms and X is chlorine or bromine. Such compounds may be diaryloxy-, bis(alkaryloxy)-, bis(aralkyloxy)-, aryloxyalkaryloxy-, aryloxyaralkyloxy-, alkaryloxyaralkyloxy- dibromo- or -dichlorogermanes, e.g., diphenoxy-, di-p-tolyloxy-, di-α- or β-naphthyloxy-, dibiphenyloxy-, dimesityloxy-, dicumyloxy-, bis-(2 - butylphenoxy)-, phenoxy - 2 - naphthyloxy-, biphenyloxyphenoxy-, (4 - ethylphenoxy)phenoxy-, dibenzyloxy-, (2 - ethylphenoxy)benzyloxy-, bis(2 - ethylphenoxy)-, benzyloxyphenoxy-, biphenyloxy(4 - ethylbenzyloxy)-, 3 - (phenylpropoxy)mesityloxy-, or β - naphthyloxyphenoxydichloro- or -dibromogermanes.

The corresponding benzenoid dihydrocarbylthiodihalogermanes, i.e., compounds of the formula (Ar—S)₂GeX₂ wherein Ar and X are as defined above, are similarly valuable for the present purpose. Such compounds are, for example, bis(phenylthio)dichlorogermane, bis(benzylthio)dibromogermane, bis(β - naphthylthio)dichlorogermane, biphenylthio(phenylthio)dichlorogermane, benzylthio(α-naphthylmethylthio)dibromogermane, (p-tolylthio) - 2 - phenylethylthiodichlorogermane, etc.

Mixed hydrocarbylhalogermanes, halohydrocarbylhalogermanes, hydrocarbylthiohalogermanes and halohydrocarbylthiohalogermanes are likewise useful in the present invention. Such compounds are, for example, methylphenyldichlorogermane, (2-propenyl)-p-tolyldichlorogermane, (2 - chloroethyl) - β - naphthyldibromogermane, (benzylthio)ethylthiodibromogermane, (2 - chlorophenyl) - 4 - butynyldichlorogermane, (n - butyl)cyclohexylthiodichlorogermane, (2 - ethylhexyl - 2,3 - dichlorophenylthiodichlorogermane, etc.

Examples of hydrocarbylhydrocarbyloxydihalogermanes, i.e., compounds of the formula R'(R'O)GeX₂ are the following: ethylethoxydichlorogermane, vinylpropoxydibromogermane, phenylhexyloxydichlorogermane, mesitylphenoxydichlorogermane, (3-butynyl)-4-pentenyldichlorogermane, cyclohexylethoxydibromogermane, 1 - butoxycyclohexyldichlorogermane, and α-naphthylpropynyloxydichlorogermane. These compounds may have halogen substituted in one or both hydrocarbyl groups. For example, (2,2-dichloropropyl)-2-chloro-4-pentynyldichlorogermane, and (2-bromo-α-naphthyl)-2,4,6-tribromophenoxydibromogermane, etc., may be used.

Also presently useful are the hydrocarbyloxyhydrocarbylthiodichlorogermanes, i.e., compounds of the formula

where X and R′ are as defined above. Such compounds are, for example, phenoxyphenylthio-, propenyloxybutynylthio-, methoxyphenylthio-, β-naphthyloxy-β-naphthylthio-, ethoxyethylthio-, m-tolyloxy-m-tolylthio-, 4-chlorophenoxybiphenylthio-, 2 - methyl - α - naphthyloxyphenylthio-, O - β - naphthylmethyl - S - phenyl-, heptyloxy(3 - cyclohexenylthio)-, or butoxy - p - cumylthiodichloro- or -dibromogermanes.

A very valuable class of halogermanes useful in this invention are the monochlorogermanes which term includes the trihydrocarbyl, trihydrocarbyloxy, and trihydrocarbylthiomonohalogermanes and their halogen-substitution products as well as the compounds monochlorogermane ($H_3GeCl$) and monobromogermane ($H_3GeBr$). Examples of such compounds are triethylchlorogermane, triphenylchlorogermane, tri-p-tolyloxychlorogermane, tricyclohexylthiochlorogermane, tris(2 - ethylhexyloxy)chlorogermane, 2 - ethylphenoxyphenylthiophenylchlorogermane, 2 - chlorobenzylthiobiphenyloxybenzylchlorogermane, dodecyloxydiphenylchlorogermane, and diethylvinylbromogermane.

Examples of the presently useful cyclic 1,3-dioxahalogermanes of the formulae

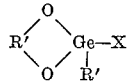

and

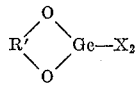

are 1 - chloro - 1 - methyl - 2,5 - dioxagermanacyclohexane, 1 - bromo - 1 - phenyl - 2,4 - dioxagermanacyclopentane, 1 - chloro - 1 - allyl - 2,6 - dioxagermanacycloheptane, 1 - bromo - 1 - butynyl - 2,5 - dioxagermanacyclohexane, 1,1 - dichloro-2,4 - dioxagermanacyclopentane, 1,1 - dibromo - 2,4 - dioxagermanacyclopentane, 1-bromo - 1 - chloro - 2,6 - dioxagermanacycloheptane, 1-chloro - 1 - dodecyloxy - 2,5 - dioxa - 4 - germanacyclohexene, and the pyrocatechol ester of chloro(2-chloroethyl)germanadiol.

Examples of the germanacycloalkane and germanacycloalkene compounds useful in this invention are 1-chlorogermanacyclobutane, 1 - bromo - 3 - germanacyclohexene, 1-chloro-1-ethoxygermanacycloheptane, 1-bromo-1-phenylthio-4,4-dimethylgermanacyclohexane, and 1,4,4,-trichloro-1-methylgermanacyclohexane.

Any of the above described halogen-containing germanium compounds will react with an aldehyde and a trivalent phosphorus ester which has at least one alkoxy or haloalkoxy group bonded to the phosphorus atom to give phosphorus-containing esters of germanium compounds. In general, aldehydes having from 1 to 18 carbon atoms may be used. However, the aldehydes are usually selected so as to minimize steric hinderance in the compound being prepared. Hence, while aldehydes having up to 18 carbon atoms may be used, it is preferred to limit the number of carbon atoms in the aldehyde reactant to no more than 12 carbon atoms when three or four halogen atoms of the germanium halide reactant are to be replaced. Likewise, when only one or two halogen atoms of a simple germanium halide reactant are to be replaced, aldehyde compounds having up to 18 carbon atoms can be used. Such aldehydic compounds, even those of higher carbon content, may of course have various substituents, as indicated herein, bonded to the aldehyde molecule without materially altering the relative reactivity of the aldehyde. Of course, mixtures of aldehydes may also be used. The presently useful aldehydes may be conveniently defined as those having the formula

in which Y is selected from the group consisting of hydrogen and hydrocarbyl radicals of from 1 to 12 carbon atoms, furyl and thienyl radicals, and said radicals carrying a substituent selected from the group consisting of halogen, cyano-, -alkyl, -O-alkyl, -S-alkyl, and -COO-alkyl, where alkyl has from 1 to 5 carbon atoms when $n$ is zero to 1, and when $n$ is 2 to 3, Y is selected from the group consisting of hydrogen and hydrocarbyl radicals of from 1 to 17 carbon atoms, furyl and thienyl radicals, and said radicals carrying a substituent selected from the group consisting of halogen, cyano, -O-alkyl, and -S-alkyl, and -COO-alkyl where alkyl has from 1 to 5 carbon atoms.

Owing to their easy availability, a particularly useful class of aldehydes includes the aliphatic aldehydes of from 1 to 18 carbon atoms, e.g., formaldehyde acetaldehyde, propionaldehyde, butyraldehyde, isobutyraldehyde, valeraldehyde, isovaleraldehyde, hexanal, heptanal, 2-ethylhexanal, octanal, 2-butyloctanal, 6-methylheptanal, decanal, undecanal, 2-methylundecanal, lauraldehyde, myristaldehyde, palmitaldehyde stearaldehyde, etc.

The presence of cyano, halogen, alkoxy, carboalkoxy and alkylthio substituents in the aldehyde has no effect on the course of the reaction; hence, there may be employed such substituted aldehydes as 3-cyanopropionaldehyde, chloroacetaldehyde, 3-butoxybutyraldehyde, 4-cyano-2,2-dimethylbutyraldehyde, 2,3-dichloropropionaldehyde, 3 - isopropoxypropionaldehyde, 3 - (ethylthio)-3-methylbutyraldehyde, 2-methyl-3-fluoropropionaldehyde, dichlorolauraldehyde, ethyl 11-formylundecanoate, succinaldehydic acid methyl ester, ethyl-4-formylbutyrate, iodoacetaldehyde, dichloroacetaldehyde, chloral, etc.

Presently useful alicyclic carboxaldehydes include cyclohexanecarboxaldehyde, 6-methyl - 3 - cyclohexenecarboxaldehyde, 2-cyclohexene-1-carboxaldehyde, cyclopentanecarboxaldehyde, 3-isopropyl - 1 - methylcyclohexanecarboxaldehyde, 5-ethoxy - 2 - cyclopentene-1-carboxaldehyde, 1-bromo-2,2,6-trimethylcyclohexanecarboxaldehyde, 2,2,6 - trimethylcyclohexanecarboxaldehyde, 2,6 - diethyl-2-cyclohexenecarboxaldehyde, etc.

Examples of unsaturated aliphatic and aromatic aldehydes which may be used in this invention are: acrolein, methylacrolein, crotonaldehyde, cinnamaldehyde, and undecenaldehyde.

The presently useful benzenoid aldehydes may be aliphatic-aromatic or purely aromatic aldehydes which may or may not be further substituted, e.g., benzaldehyde, o-, m-, or p-tolualdehyde, phenylacetaldehyde, 1- or 2-naphthylaldehyde, biphenyl-4-carboxaldehyde, hydrocinnamaldehyde, 2,3-dichlorobenzaldehyde, 4-formylacetanilide, piperonal, 2-, 3-, or 4-butoxybenzaldehyde, p-(ethoxy)benzaldehyde, 3,4-dipropoxybenzaldehyde, 4-(n-butylthio)benzaldehyde, o-, m-, or p-iodobenzaldehyde, 3,4- or 3,5-dibromobenzaldehyde, 5-tert-butyl-m-tolualdehyde, 2-p-cymenecarboxaldehyde, 6-methoxy-2-naphthaldehyde, biphenylcarboxaldehyde, 6-methoxy-3-biphenylcarboxaldehyde, etc.

The presently useful aldehydes may also be heterocyclic aldehydes such as 2- or 3-furaldehyde, 5-acetamido-2-furaldehyde, 5-bromo- or chloro-2-furaldehyde, 5-methyl-2-furaldehyde, 4-ethoxy-2-furaldehyde, 5-propylthio- 2-furaldehyde, 2- or 3-thiophenecarboxaldehyde, 3,5-dimethyl-2-thiophenecarboxaldehyde, 2,5 - dichloro-3-thiophenecarboxaldehyde, 2,5-diethyl-3-thiophenecarboxaldehyde, etc.

Trivalent phosphorus esters which are generally useful with aldehydes and germanium halides described above are either simple or mixed phosphites, phosphonite, and phosphinites having at least one alkoxy or haloalkoxy radical containing from 1 to 20 carbon atoms. Examples of useful phosphite compounds are trimethyl, triethyl, triisopropyl, tri-n-propyl, tri-n-butyl, tri-tert-amyl, tri-n-hexyl, tri-n-heptyl, tris(2-ethylhexyl), tri-n-octyl, trinonyl, tridecyl, triundecyl, tri-tert-dodecyl, tris-n-octadecyl, amyl diethyl, butyl di-n-propyl, n-dodecyl dimethyl, ethyl octyl propyl, diethyl pentadecyl, tris(2-chloroethyl), tris(3-chloropropyl), tris(2 - chloropropyl), tris(3,4 - dichlorobutyl), tris(2-bromoethyl), tris(2-fluoroethyl), tris(dichlorododecyl), 2-chloroethyl diethyl, 3-bromopropyl bis(2 - chloroethyl), diamyl tri-chlorooctyl, 2 - chloroethyl 3-chloropropyl 4-chlorobutyl, 2-chloroethyl methyl propyl, 4-bromobutyl bis(10-bromoheptadecyl), tris(2,3-dichloropropyl), diphenyl methyl, di(p-tolyl) ethyl, and di(α-naphthyl) 2-chloroethyl phosphites. Examples of phosphonite compounds are dimethyl methylphosphonite, di-n-propyl propylphosphonite, diethyl amylphosphonite, ethyl octyl propylphosphonite, diethyl propylphosphonite, dinonyl methylphosphonite, 2-chloroethyl butyl propylphosphonite, dibutyl phenylphosphonite, and ethyl benzyl benzylphosphonite. Examples of phosphinite compounds are methyl dimethylphosphinite, isopropyl diethylphosphinite, n-hexyl n-hexyloctylphosphinite, 2-chloroamyl diethylphosphinite, ethyl octylpropylphosphinite, propyl methylethylphosphinite, methyl diphenylphosphinite, and methyl phenylbenzylphosphinite. Mixtures of phosphite, phosphonite, and phosphinite esters may also be used.

When formaldehyde is reacted with germanium tetrachloride or tetrabromide and a trialkyl or trihaloalkyl phosphite, for example, the products prepared may be either tetra[(dialkoxyphosphinyl)methyl]germanates or tetra{tetra[bis(haloalkoxy)phosphinyl]methyl}germanates.

Similarly when the reactants are formaldehyde, germanium tetrachloride and an alkyl or haloalkyl phosphonite or phosphinite the products prepared may be tetra[(haloalkoxyalkylphosphinyl)methyl]germanates, tetra[(alkoxyalkylphosphinyl)methyl]germanates, tetra[(dialkylphosphinyl)methyl]germanates, or tetra[(dihaloalkylphosphinyl)methyl]germanates, respectively, depending upon the presence and position of the halogen atoms in the alkyl groups.

Germanium tetrachloride or tetrabromide reacts with four moles of an aldehydic carbonyl compound and four moles of a trialkyl phosphite of from 1 to 20 carbon atoms to give tetra[1-(dialkoxyphosphinyl)hydrocarbyl]germanates, i.e., compounds of the formula

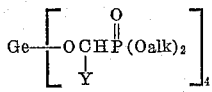

where Y is as defined above and alk denotes the alkyl radical of from 1 to 20 carbon atoms. Thus, reaction of one mole of germanium tetrachloride with four moles of acetaldehyde and four moles of tri-n-butyl phosphite gives tetra[1 - (di-n-butoxyphosphinyl)ethyl]germanate, i.e., a compound of the above formula in which Y is methyl and alk is n-butyl. Other compounds of the above formula which are prepared according to the present process are, e.g., Tetra[1-(dimethoxyphosphinyl)ethyl]germanate
Tetra[1-diethoxyphosphinyl)undecyl]germanate
Tetra[1-(di-n-octyloxyphosphinyl)2-methylpropyl]germanate
Tetra[1-(didodecyloxyphosphinyl)propyl]germanate Tris(haloalkyl) phosphites react with germanium tetrachloride or tetrabromide and an aldehydic carbonyl compound to give tetra{1-[bis(haloalkoxy)phosphinyl]alkyl}germanates in the same manner as above. Thus, reaction of tris(2-chloroethyl) phosphite with propionaldehyde and germanium tetrachloride gives, e.g., tetra{1-[bis(2-chloroethoxy)phosphinyl]propyl}germanate.

When the aldehyde is banzaldehyde, the products with germanium tetrachloride or tetrabromide and dialkyl alkylphosphonites are tetra[α-(alkoxyalkylphosphinyl)benzyl]germanates, i.e., compounds of the formula

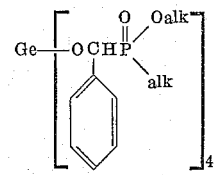

wherein alk is an alkyl radical of from 1 to 20 carbon atoms.

Reaction between cycloalkanecarboxaldehydes, germanium tetrachloride or tetrabromide and alkyl dialkylphosphinites gives compounds such as tetra[diethylphosphinyl)cyclohexylmethyl]germanate, which is obtained from cyclohexanecarboxaldehyde, ethyl diethylphosphinite, and germanium tetrachloride or tetrabromide.

One mole of germanium tetrachloride or tetrabromide reacts with three moles of an aldehydic carbonyl compound and three moles of a dialkyl alkylphosphonite ester to give tris[1-(alkoxyalkylphosphinyl)hydrocarbyloxy]halogermanes, i.e., compounds of the formula

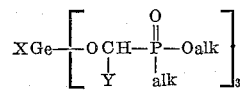

where Y is as defined above, alk denotes an alkyl radical derived from the phosphorous ester, and X is bromine or chlorine.

Similarly one mole of germanium tetrachloride or tetrabromide reacts with two moles of an aldehydric carbonyl compound and two moles of an alkyl dialkylphosphinite ester to give bis[1-(dialkylphosphinyl)hydrocarbyloxy]dihalogermanes, i.e., compounds of the formula

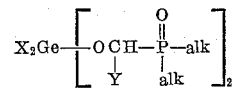

where Y is as defined above, alk is an alkyl radical derived from the phosphorus ester reactant, and X is bromine or chlorine.

If germanium tetrachloride or tetrabromide is treated with only one mole of aldehyde and one mole of a trivalent phosphorus ester, only one halogen atom attached to the germanium will be replaced in the manner indicated above.

Examples of compounds produced by replacing only one, two or thre halogen atoms in germanium tetrachloride in the above manner are:

1-(diethoxyphosphinyl)propoxytrichlorogermane,
α-(phenoxyphenylphosphinyl)benzyloxytrichlorogermane,
Bis(1-dihexylphosphinyl)cyclohexyloxytribromogermane,
Bis[1-(dodecyloxyphenylphosphinyl)ethoxy]dichlorogermane,
Bis[α-(phenoxyphenylphosphinyl)-p-methylbenzyloxy]dichlorogermane,
Tris{1-[bis(4-chlorobutoxy)phosphinyl]heptyloxy}chlorogermane,
Tris[α-(ethoxyethylphosphinyl)furfuryloxy]bromogermane, and
Tris[1-(phenylphenoxyphosphinyl)propoxy]chlorogermane.

Reaction of formaldehyde and a trialkyl phosphite with tribromo-, trichloro-, dibromo-, dichloro-, monobromo- or monochlorogermane or a derivative thereof wherein at least one of the hydrogen atoms bonded to germanium is replaced by any of the groups R', R'O, R'S, XR', and XR'S defined above yields the corresponding tris-, bis-, or mono[(dialkoxyphosphinyl)methoxy]germane when all of the halogen is replaced, i.e., compounds of the formulae

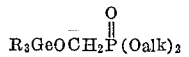

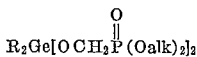

and

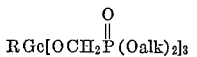

where R is as defined above, and alk represents an alkyl group of from 1 to 20 carbon atoms as in the trialkyl phosphite starting material.

When phosphonite and phosphinite esters are used in place of phosphite esters, the reaction is similar. Thus, the reaction of trichlorogermane, propionaldehyde, and diethyl ethylphosphinite gives tris[1-(ethoxyethylphosphinyl)propoxy]-germane, i.e., a compound having the formula

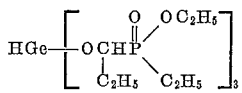

More examples of reaction products of trichloro or tribromogermane, aldehydic carbonyl compounds, and alkyl, haloalkyl, or mixed alkyl haloalkyl phosphites, phosphonites, and phosphinites are:

Tris[1-dipentyloxyphosphinyl)octyloxy]-3-chloropropylgermane,
Tris[1-(nonyloxydecylphosphinyl)butoxy]ethylgermane,
Tris[1-(butoxypropoxyphosphinyl)propoxy]dischloromethylgermane,
Tris[α-(diethoxyphosphinyl)benzyloxy]-2-naphthylgermane,
Tris-{α-[bis(2-chloropropoxy)phosphinyl]thenyloxy}-vinylgermane, Examples of reaction products of trichloro- or tribromogermane compounds and phosphite, phosphonite, and phosphinite esters which have benzenoid radicals attached to the phosphorus atom are:

Tris[1-(ethoxphenylphosphinyl)propoxy]ethylgermane
Tris-{1-[bis(2-phenylethoxy)phosphinyl]ethoxy}-4-bromobutylgermane
Tris[1-(p-tolyloxy-p-tolylphosphinyl)heptyloxy]amylgermane
Tris{[bis(2-chloro-α-naphthyl)phosphinyl]methoxy}cyclohexylgermane
Tris[1-(diphenylphosphinyl)-3-phenyl-2-propenyloxy]-2-chlorophenylgermane By treating tribromo- or trichlorogermane compounds with aldehydic carbonyl compounds and trivalent phosphorus esters in the molar proportion of 1:2:2, respectively, products of the formula

where A, R, X, and Y are as defined above, are prepared. Similarly, by treating tribromo- or trichlorogermane compounds with aldehydes and trivalent phosphorus esters in the molar proportion of 1:1:1, respectively, products of the formula

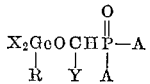

where A, R, X, and Y are as defined above, are prepared.

Examples of such compounds are:

[(Heptyloxyheptylphosphinyl) (cyclohexyl)methoxyl]-decyldichlorogermane,
[Bis(p-tolyloxy)phosphinyl]methoxy-5,5-dichloroamyldibromogermane,
{1-[bis(4-chlorophenyl)phosphinyl]-4-hexenyloxy}allyldichlorogermane.

Examples of products involving the reaction between a dichloro- or dibromogermane, an aldehyde, and an alkyl or haloalkyl trivalent phosphorus ester where all of the halogen attached to the germanium atom is replaced are:

Bis[1-(diethoxyphosphinyl)ethoxy]dimethylgermane,
Bis[1-(dimethoxyphosphinylpropoxy]chloromethyl-methylgermane,
Bis[1-(diethoxyphosphinyl)ethoxy]-2-naphthylethylgermane,
Bis[1-(didodecyloxyphosphinyl)butoxy]dibiphenylylgermane,
Bis[α-(hexyloxyethylphosphinyl)benzyloxy]bis(ethylthio)germane,
Bis{1-[bis(2-chloropropoxy)phosphinyl]pentyloxy}dibenzyloxygermane,
Bis[1-diethylphosphinyl)-p-tolyoxy]ethylcyclohexylgermane,
1,1-bis[1-(dinonyloxyphosphinyl)-6-cyanohexyloxy]germanacyclopentane,
Bis[1-(dihexyloxyphosphinyl)propoxy]diethylgermane,
Bis[α-(didecyloxyphosphinyl)furfuryloxy]ethylallylgermane,
Bis[1-(bromopropoxychloropropoxyphosphinyl)-4-carbethoxybutoxy]methyl-2-naphthylgermane, and
1-{bis[1-(diundecyloxyphosphinyl)ethoxy]-2,5-dioxagermanacyclohexane.

Examples of products involving the reaction between dichloro- or dibromogermanes, aldehydic carbonyl compounds, and phosphite, phosphonite, or phosphinite compounds having one or two aromatic radicals attached to the phosphorus atom are:

Bis[1-(methoxyphenylphosphinyl)ethoxy]bis(2-chloropropyl)germane,
Bis{1-[bis(4-chlorophenyl)phosphinyl]propoxy}diethylgermane,
Bis[1-(2,4-xylyloxy-2,4-xylylphosphinyl)nonyloxy]bis(2-chlorobutyl)germane, and
Bis[1-(diphenoxyphosphinyl)propoxy]methoxymethylthiogermane.

Where the reaction between the dibromo- or dichlorogermane compound, the aldehydic carbonyl compound, and the trivalent phosphorus ester takes place in the molar ratio of 1:1:1, respectively, the product will have the formula

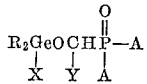

where A, R, X, and Y, are as defined above. Examples of such products are:

{1-[(4-bromobutoxy)butylphosphinyl]pentyloxy}didodecylchlorogermane,
[1-(methoxyphenoxyphosphinyl)-2-propenyloxy]chloromethylethylchlorogermane, and
[1-(dihexylphosphinyl)-4-cyanobutoxy]bis(ethylthio)bromogermane.

Examples of compounds of this invention which are made by reacting a monochloro- or monobromogermane compound, i.e., compounds having the structure, $R_3GeX$, where each of the three R groups on the germanium atom is satisfied by any one of the members of the group consisting of hydrogen, R', R'O, XR', R'S, XR'O, XR'S as defined above, with an aldehydic carbonyl compound, and a trivalent phosphorus ester, said aldehyde compound and trivalent phosphorus ester being as defined above, are:

[1-(diethoxyphosphinyl)ethoxy]triethylgermane,
{1-[bis(2-bromopropoxy)phosphinyl]-2-phenylethoxy} tripropylgermane,
[1-(octyloxyoctylphosphinyl)-3-phenyl-2-propenyloxy] dipropylthiopropylgermane,
{α-[(2-bromoethoxy)heptylphosphinyl]-6-methyl-3-cyclohexenylmethoxy}-1-methylgermanacyclohexane,
[1-(decyloxydodecyloxyphosphinyl)-2,2,2-trichloroethoxy]triphenylthiogermane,
[1-(dihexylphosphinyl)-3-methyl-2-propenyloxy]-2-naphthyl-bis(2-chloropropylthio)germane,
{1-[bis(2,2-dibromobutoxy)phosphinyl]piperonyloxy} tris(3-chloropropyl)germane,
{1-[bis(2-chlorohexyloxy)phosphinyl]-2-butenyloxy} 2,4-dichlorobenzyldimethylgermane,
[1-(diethoxyphosphinyl)cyclohexyloxy]trimethylgermane, and
[1-(2-chloroethoxy-3,5-dichloropentoxyphosphinyl) octadecyloxy]bis(chloroethyl)chloromethylgermane.

Examples of reaction products of monochloro- or monobromogermane, an aldehydic carbonyl compound, and a trivalent phosphorus ester having one or two aromatic radicals attached to the phosphorus atom are:

{1-[methoxy(2-methylphenyl)phosphinyl]undecyloxy} triphenylthiogermane,
{1-[bis(p-isopropylphenylmethyl)phosphinyl]propoxy} 2,4-dichlorobenzylthiodimethylgermane, and
[1-(phenoxyphenylphosphinyl)propoxy]diethylvinylgermane.

As indicated above, products of this invention can be prepared from a trivalent phosphorus ester, a monochloro- or monobromogermane, and an aliphatic aldehyde having a substituent therein. When said mixture consists of tris(2-chloroethyl)chlorogermane, there are obtained with the substituted aliphatic aldehydes shown below, 1-[bis(2-chloroethoxy)phosphinyl]-D - tris(2 - chloroethyl) germanes where -D- represents the hydrocarbyloxy radicals derived from the given aldehyde:

| Aldehyde | -D- |
| --- | --- |
| 2,3-dichloropropionaldehyde | 2-3-dichloropropoxy. |
| 4-cyanobutyraldehyde | 4-cyanobutoxy. |
| 3-ethylthiopropionaldehyde | 3-ethylthiopropoxy. |
| 8-methoxyoctanal | 8-methoxyoctyoxy. |
| 10-fluorodecanol | 10-fluorodecyloxy. |
| Phenoxyacetaldehyde | 2-phenoxyethoxy. |
| 2-chlorobenzaldehyde | 2-chlorobenzyloxy. |
| 2-hexenal | 2-hexanyloxy. |
| p-Cyanobenzaldehyde | p-Cyanobenzyloxy. |
| m-(Methylthio)benzaldehyde | M-(Methylthio(benzyloxy. |
| o-Methybenzaldehyde | o-Methylbenzyloxy. |

As hereinbefore disclosed, the presence of such substituents as the alkoxy, halogen, carboalkoxy, alkylthio, and alkyl radicals in the aldehyde constituent does not affect the course of the reaction. Thus, when instead of an aliphatic aldehyde there is employed, e.g., an alkoxy substituted aldehyde such as 3-butoxybutyraldehyde, the reaction product with triethyl phosphite and a cyclic germanium halide such as 1-chloro-1-propyltho-2,5-dioxagermanacyclohexane is [1-(diethoxyphosphinyl)-3-butoxybutoxy]-1-propylthio-2,5-dioxagermanacyclohexane; with a substituted benzaldehyde such as 2,4-dichlorobenzaldehyde, triethyl phosphite, and 1-chloro-1-propylthio-2,5-dioxagermanacyclohexane the product is [α-(diethoxyphosphinyl)-2,4-dichlorobenzyloxy]-1-propylthio - 2,5 - dioxagermanacyclohexane, etc.

Reaction of a germanium compound having at least one halogen attached to the germanium atom, an aldehydic carbonyl compound, and a trivalent phosphorus ester having at least one alkoxy or haloalkoxy group bonded to the phosphorus atom thereof takes place by mixing together the three reactants in the above indicated proportions at ordinary, decreased, or increased temperature and allowing the resulting reaction mixture to stand until formation of the phosphinylhydrocarbyloxygermanium compound is complete. Thus, the germanium halide and the trivalent phoshorus ester may be first mixed together and the carbonyl compound added to the resulting mixture, or the carbonyl compound and the trivalent phosphorus ester may be mixed and the germanium halide compound added thereto, or all three reactants can be mixed simultaneously. Because the reaction may be exothermic, gradual contact of the reactants is usually recommended in order to obtain smooth reaction. However, as will be apparent to those skilled in the art, the exothermal nature of the reaction becomes less of a factor as the molecular weight of the reactants, and particularly of the phosphorus ester, is increased. Also, when the aldehyde is either a higher alkanecarboxaldehyde or an aralkyl or alkaryl aldehyde, reaction is generally not so rapid as it is with lower aliphatic aldehydes or with benzaldehyde. It is thus recommended that with each initial run, cooling be employed until there appears to be no spontaneous increase in temperature as a consequence of the mixing. In most instances, the reaction is mildly exothermic initially. When the reaction goes to completion without the use of extraneous heat is determined by the nature of the reactants. Completion of the reaction in any event, can be readily ascertained by noting cessation in change of viscosity, refractive index, or by the quantity of by-product alkyl or haloalkyl halide produced. Using the lower alkanecarboxaldehydes, which aldehydes are generally very reactive, external cooling is usually advantageous. When working with such aldehydes optimum conditions comprise gradual addition of the aldehyde to the mixture of trivalent phosphorus ester and germanium halide reactants with application of external cooling and thorough stirring. Usually it suffices to maintain the reaction temperature at, say, from −80 to 50° C. during addition of aldehyde. When all of the aldehyde has been added to said mixture, and there is no longer any evidence of exothermic reaction, completion of the reaction may be assured by heating the reaction mixture to a temperature of from, say 50° C. to 150° C. With the more sluggish aldehydes, e.g., 2-phenylacetaldehyde or lauraldehyde, it may be necessary to heat the reaction mixture moderately, say to a temperature of 50° C. before an exothermic reaction is started. Employing naphthaldehyde as the aldehyde reactant and a high molecular weight trivalent phosphorus ester, even higher temperature may be required, e.g., temperature of from 100° C. to 150° C. appear to give the best results.

When it is desired to replace only part of the halogen atoms linked to the germanium atom, it is preferred to mix the proper proportions of reactants at low temperature, say at −80 to 0° C. and allow the temperature to rise until the reaction is completed.

The reactants are advantageously employed in stoichiometric proportions, i.e., one mole of aldehydic carbonyl compound and one mole of the trivalent phosphorus ester per halogen atom to be replaced from the germanium atom. Thus, with a germanium tetrahalide, such as germanium tetrachloride, there are advantageously used four moles each of the aldehyde and the trivalent phosphorus ester when complete replacement of halogen is desired. However, if it is desired to replace only three, two, or one of the halogen atoms linked to the germanium atom in the germanium tetrahalide, then only three, two or one moles, respectively, of each of the aldehyde and trivalent phosphorus ester are used per mole of germanium tetrahalide. With a germanium trihalide, e.g., an alkyltrichlorogermane, there are used three moles each of the aldehyde and trivalent phosphorus ester when complete replacement of halogen in the alkyltrichlorogermane is desired, whereas, if it is desired to replace only, say, one such halogen atom, then only one mole each of carbonylic compound and trivalent phosphorus ester are used. The same principle of proportioning of the reactants applies when working with dihalo- and monohalogermanes. Said stoichiometric proportions are advantageously employed in that thereby good yields of desired product result and there arises substantially no problem of separating any excess reactants. However, where it is not important to control the number of halogen atoms replaced from the germanium atom, excess amounts of the aldehyde compound, phosphorus ester, or the germanium halide reactants would have to be removed if a pure product were desired.

Formation of the desired product, i.e., a phosphinylhydrocarbyloxygermanium compound, is accompanied by the formation of a halogenated alkane as a by-product. Thus, the reaction of, say, trimethylchlorogermane, acetaldehyde, and triethyl phosphite gives ethyl chloride as a by-product:

$$(CH_3)_3GeCl + CH_3CHO + P(OC_2H_5)_3 \longrightarrow$$

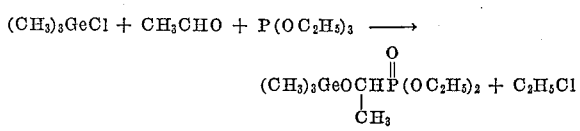

The by-product halogenated alkanes are generally articles of commerce for which many applications exist. Thus, while many currently employed processes for the manufacture of organic compounds of germanium entail substantial waste of halogen in that by-products of little commercial importance are formed, in the present instance all of the halogen constituent of the raw materials is converted to products of economic importance.

The process of the present invention is readily conducted in the absence of an inert diluent or catalyst. However, catalysts and diluents or solvents may be employed. The use of diluents may be particularly advantageous when working with the highly active aldehydes; such diluents may be, e.g., benzene, toluene, dioxane, methylene chloride, or hexane. When employing no diluent and using substantially the stoichiometric proportion of reactants, the reaction product which consists essentially of the phosphinylhydrocarbyloxygermanium compound dissolved in the halogenated alkane, which is produced as a by-product in the reactions, may be used directly for a variety of industrial and agricultural purposes without purification.

An alternative method for the preparation of the present compounds comprises reaction of a germanium halide compound, described above, with an ester of an α-hydroxyphosphonic or -phosphinic acid, or with an α-hydroxyphosphine oxide in the presence of a basic material to remove the hydrogen halide by-product. Thus, reaction of, say, a trialkylchlorogermane with such a phosphorus compound in the presence of pyridine proceeds as follows:

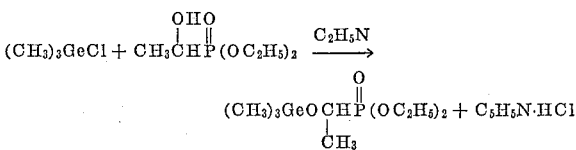

Reaction with a germanium tetrahalide, trihalide, or dihalide results in a similar replacement of four, three or two halogen atoms, respectively, if stoichiometric amounts of the α-hydroxyphosphorus compound are used. The germanium halide compound may be germanium tetrabromide or tetrachloride, or a compound of the formula RGeX₃, R₂GeX₃, R₃GeX where X is bromine or chlorine and R is selected from the group consisting of hydrocarbyl, halohydrocarbyl, hydrocarbyloxy, hydrocarbylthio, halohydrocarbyloxy, and halohydrocarbylthio radicals having from 1 to 20 carbon atoms. The α-hydroxyphosphorus reactant may be any compound of the general formula

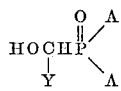

wherein Y is selected from the group consisting of hydrogen and hydrocarbyl radicals of from 1 to 11 carbon atoms, furyl-, and thienyl- radicals, and said radicals carrying a substituent selected from the group consisting of halogen, cyano-, -alkyl, -O-alkyl, -S-alkyl, and -COO-alkyl, where alkyl has from 1 to 5 carbon atoms, when $n$ is 0 to 1, and when $n$ is 2 to 3, Y is selected from the group consisting of hydrogen and hydrocarbyl radicals of from 1 to 17 carbon atoms, furyl and thienyl radicals, and said radicals carrying a substituent selected from the group consisting of halogen, cyano, -alkyl, -O-alkyl, -S-alkyl, and -COO-alkyl where alkyl has from 1 to 5 carbon atoms; and each A is selected from the group consisting of hydrocarbyl, hydrocarbyloxy, halohydrocarbyl, and halohydrocarbyloxy radicals which contain from 1 to 20 carbon atoms, preferably 1 to 12 carbon atoms.

The compounds of this invention which have halogen atoms attached to the germanium atom can be reacted with various chemicals to replace or relocate the halogen atoms so attached. Thus, such compounds may be reacted with alcohols, or thiols, to replace the halogen atoms with hydrocarbyloxy, or hydrocarbylthio radicals. Particularly useful chemicals for reaction with the halogen compounds are epoxides having from 1 to 12 carbon atoms. Epoxides react with the bromine or chlorine atoms attached to the germanium atoms to form halohydrocarbyloxy radicals attached for the germanium atom. For example, [1(dipropoxyphosphinyl)ethoxy]dimethylchlorogermane reacts with, say, 1,2-epoxybutane according to the following scheme,

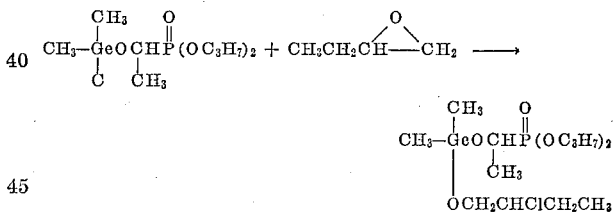

to give [1-(dipropoxyphosphinyl)ethoxy] - 2 - chlorobutoxydimethylgermane. Examples of epoxides that can be used are: ethylene oxide, propylene oxide, 2,3-epoxyhexane, 3,4-epoxyhexane, 1,2-epoxy-2-methylpropane, 2,3-epoxybutane, 3,4-epoxy-4-methyl-1-pentene, 2,3-epoxypentane, (1,2-epoxypropyl)benzene, 1,2-epoxyethylnaphthalene, and 4,5-epoxydecane. The epoxides used can also contain substituent groups therein such as alkoxy, carboalkoxy, aryloxy, alkylmercapto, arylmercapto, cyano, halogen, etc.

The compounds generally provided by this invention are stable, usually high boiling materials which range from viscid liquids to waxy or crystalline solids. They are used as biological toxicants, e.g., as insecticides, fungicides, nematocides, bacteriostats; as lubricant and gasoline additives; as functional fluids, e.g., in force-transmission media and dielectric applications; as plasticizers for synthetic resins and plastics; as rubber-compounding chemicals; as flame-proofing agents for cellulosic and carbonaceous combustible materials, e.g., surface coatings, lacquers, polymers, resins, adhesives and sealing compounds; as antioxidants; as dielectrics; and as pharmaceuticals. The preparation of these compounds also provides a convenient route for purifying germanium. The presently provided compounds may be decomposed to provide relatively pure germanium oxides or elemental germanium.

The invention is further illustrated, but not limited, by the following examples.

Example 1

Bromotriethylgermane (10.9 g., 0.046 mole) was added at a rapid dropwise rate to a stirred solution of triethyl phosphite (7.6 g., 0.046 mole) and propionaldehyde (2.7 g., 0.047 mole) while holding the temperature below 30° C. It was heated at about 60° C. for 1.5 hours and then concentrated to 95° C. (0.5 mm.). Fractionation gave 11.0 g. (68%) of [1-(diethoxyphosphinyl)propoxy] triethylgermane, B.P. 98°–101° C. (0.1 mm.), $n_D^{25}$ 1.4475, and having the structure,

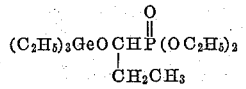

*Analysis.*—Calc'd for $C_{13}H_{31}GeO_4P$: C, 44.00; H, 8.80; Ge, 20.25; P, 8.74; Br, 00.00. Found: C, 43.90; H, 8.70; Ge, 20.28; P, 8.79; Br, trace.

The nuclear magnetic resonance chemical shift for phosphorus was —25.4 p.p.m. ($H_3PO_4$, $P^{31}$ resonance).

Example 2

To a reaction flask containing 22.3 g. (0.57 mole) of tris(2-chloropropoxy)chlorogermane there was added 9.5 g. (0.057 mole) of triethyl phosphite while cooling in an ice bath to 5° C. Then 6.1 g. (0.057 mole) of benzaldehyde was added at a rapid dropwise rate while holding the temperature below 10° C. The solution was allowed to warm to room temperature and then was heated at 65° C. for one hour. The solution was then concentrated to 100° C. (1.3 mm.) to give 34.0 g. (99.5%) of [α - (diethoxyphosphinyl)benzyl]tris(2 - chloropropyl) germanate,

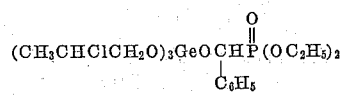

|  | Found | Anal. Calc'd for $C_{20}H_{34}Cl_3GeO_7P$ |
|---|---|---|
| Percent C | 40.39 | 40.30 |
| Percent H | 5.96 | 5.75 |
| Percent Cl | 17.72 | 17.85 |
| Percent Ge | 12.38 | 12.18 |
| Percent P | 5.28 | 5.20 |

Example 3

To a mixture consisting of 14.1 g. (0.242 mole) of propionaldehyde and 40.3 g. (0.242 mole) of triethyl phosphite there was added 13.4 g. (0.242 mole) of germanium tetrachloride at a dropwise rate while holding the temperature below —15° C. Upon completion of the addition of the germanium tetrachloride, the temperature was held below —10° C. until the exothermic reaction appeared to be complete. The solution was allowed to warm to room temperature and then heated to 65° C. for 0.5 hour. It was concentrated to 110° C. (0.25 mm.) to give 50.4 g. of substantially pure tetrakis[1-(diethoxyphosphinyl)propyl]germanate,

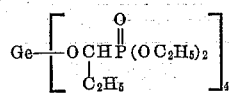

|  | Found | Anal. Calc'd for $C_{28}H_{64}GeO_{16}P_4$ |
|---|---|---|
| Percent C | 39.39 | 39.45 |
| Percent H | 7.75 | 7.57 |
| Percent Ge | 8.63 | 8.52 |
| Percent P | 14.37 | 14.52 |

Example 4

For the purpose of this example, tris(2-chloropropoxy) chlorogermane was prepared as follows:

A mixture of 15.0 g. (0.07 mole) of germanium tetrachloride and 12.2 g. (0.21 mole) of propylene oxide was heated to reflux under a Dry Ice condenser. The temperature gradually rose to 85° C. over a period of half an hour. It was heated for 15 minutes at this temperature and then concentrated to 95° C. (12 mm.) to give 27.8 g. of tris(2-chloropropoxy)chlorogermane which was used in the following reaction.

To a reaction flask containing 27.8 g. (0.71 mole) of tris(2-chloropropoxy)chlorogermane there was added 11.9 g. (0.71 mole) of triethyl phosphite while cooling to 5° C. or below. Then 8.6 g. (0.71 mole) of p-tolualdehyde was added at a dropwise rate while maintaining the temperature below 20° C. The solution was then heated to 70° C. for one hour and concentrated to 115° C. (0.9 mm.) to give 37.3 g. of [α-(diethoxyphosphinyl)-4-methylbenzyl]tris(2-chloropropyl)germanate,

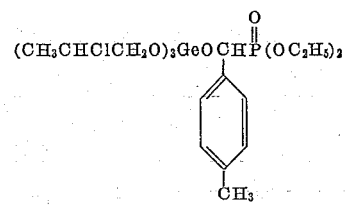

|  | Found | Anal. Calc'd for $C_{21}H_{36}Cl_3GeO_7P$ |
|---|---|---|
| Percent C | 41.26 | 41.40 |
| Percent H | 5.78 | 5.95 |
| Percent Cl | 17.59 | 17.43 |
| Percent Ge | 12.13 | 11.90 |
| Percent P | 5.13 | 5.08 |

Example 5

Germanium tetrachloride (15.0 g., 0.07 mole) was added dropwise to a reaction flask containing a mixture of 34.9 g. (0.21 mole) triethyl phosphite and 22.3 g. (0.21 mole) benzaldehyde while holding the temperature below 10° C. The reaction mixture was allowed to warm slowly to room temperature. It was then warmed quickly to 40° C. and cooled to room temperature again. Propylene oxide (8.1 g., 0.14 mole) was added dropwise to the above reaction mixture while holding the temperature below 35° C. Solution was then heated for 0.5 hour at reflux and concentrated to 105° C. (1 mm.). There was thus obtained 59.4 g. (95%) of tris[α-(diethoxyphosphinyl)benzyl]-2-chloropropyl germanate,

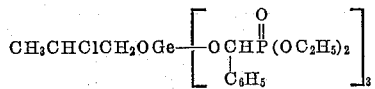

Example 6 p-Tolualdehyde (8.4 g., 0.07 mole) was added dropwise to a reaction flask containing 11.6 g. (0.07 mole) of triethyl phosphite and 15.0 g. (0.07 mole) of germanium tetrachloride while holding the temperature between 5° and 10° C. Upon completion of the addition, the solution was refluxed under a Dry Ice condenser for one hour and then concentrated at 110° C. (0.5 mm.) to give 34.0 g. of [α-(diethoxyphosphinyl)-4-methylbenzyl] tris(2-chloropropyl)germanate,

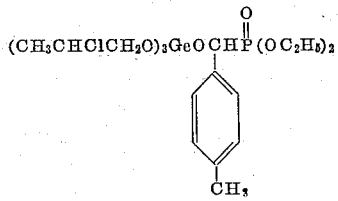

|  | Found | Anal. Calc'd for $C_{21}H_{36}Cl_3GeO_7P$ |
|---|---|---|
| Percent Cl | 16.74 | 17.42 |
| Percent Ge | 11.90 | 11.88 |
| Percent P | 5.84 | 5.08 |

Example 7

Acrolein (3.9 g., 0.07 mole) was added at a slow dropwise rate to a reaction flask containing 23.4 g. (0.07 mole) of trihexyl phosphite and 15.0 g. (0.07 mole) of germanium tetrachloride while holding the temperature below 20° C. When the addition of the acrolein was completed the mixture was warmed to 60° C. and immediately cooled to 18° C. Then 18.0 g. (0.31 mole) of propylene oxide was added at a slow dropwise rate. On completion of the addition of the propylene oxide, the solution was warmed at reflux for one hour under a Dry Ice condenser and then concentrated to 100° C. (0.35 mm.) to give 42.9 g. of [1-(dihexyloxyphosphinyl)-2-propenyl] tris(2-chloropropyl)germanate,

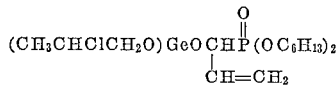

|  | Found | Anal. Calc'd for $C_{24}H_{48}Cl_3GeO_7P$ |
|---|---|---|
| Percent Cl | 15.97 | 16.18 |
| Percent Ge | 11.40 | 11.02 |
| Percent P | 5.00 | 4.72 |

Example 8

Trichlorophenylgermane (8.5 g., 0.033 mole) was added dropwise to a stirred solution of triethyl phosphite (16.5 g., 0.099 mole) and acetaldehyde (4.4 g., 0.099 mole) while holding the temperature below 20° C. The solution was heated to reflux under a Dry Ice condenser for 1.5 hours and then concentrated to 105° C. (0.5 mm.) to obtain 21.6 (94.5%) of tris[1-(diethoxyphosphinyl)ethyl]phenylgermane,

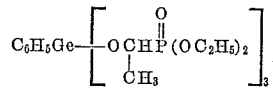

|  | Found | Anal. Calc'd for $C_{24}H_{47}GeO_{12}P_3$ |
|---|---|---|
| Percent C | 41.17 | 41.70 |
| Percent H | 6.81 | 6.85 |
| Percent Ge | 10.02 | 10.48 |
| Percent P | 12.76 | 13.40 |

Example 9

To a reaction flask containing 18.8 g. (0.07 mole) of tris(2-chloroethyl)phosphite and 8.0 g. (0.07 mole) of heptaldehyde there was added slowly 15.0 g. (0.7 mole) of germanium tetrachloride while holding the temperature between 10° C. and 15° C. Upon the completion of the addition, the temperature was allowed to rise slowly to room temperature and then heated to 60–70° C. for 20 minutes. The product at this stage was essentially {1-[bis(2 - chloroethoxy)phosphinyl]heptyloxy}trichlorogermane. Propylene oxide (21.7 g., 0.31 mole) was added at a dropwise rate and the solution then heated to reflux for one hour under a Dry Ice condenser. It was concentrated to 107° C. (0.6 mm.) to obtain 49.0 g. of substantially pure 1-[bis(2-chloroethoxy)phosphinyl]heptyl tris-(2-chloropropyl)germanate,

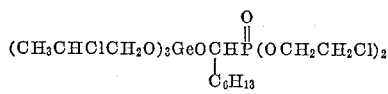

Example 10

Germanium tetrachloride (15.0 g., 0.07 mole) was added dropwise to a stirred mixture of 8.7 g. (0.07 mole) of trimethyl phosphite and 9.8 g. (0.07 mole) of o-chlorobenzaldehyde while holding the temperature below 5° C. Propylene oxide was then added dropwise while holding the temperature below 35° C. The mixture was refluxed two hours under a Dry Ice condenser, whereupon it liquefied and cleared. It was concentrated to 105° C. (2.5 mm.) to give [α-(dimethoxyphosphinyl)-2-chlorobenzyl]-tris(2-chloropropyl)germanate,

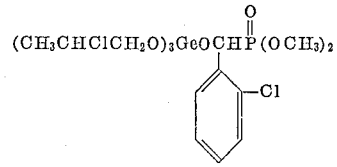

Example 11

To a reaction flask containing 19.5 g. (0.05 mole) of tris(2-chloropropoxy)chlorogermane there was added 8.4 g. (0.05 mole) of triethyl phosphite and the mixture was cooled to below 10° C. immediately. Ethyl 4-formyl-butyrate, 7.3 g. (0.05 mole), was added dropwise while cooling below 15° C. On completion of the exothermic reaction, the mixture was heated to 70° C. for one hour and then concentrated to 100° C. to give 27.8 g. of [1-(diethoxyphosphinyl)- 4 - carboethoxybutyl]tris(2 - chloropropyl)germanate,

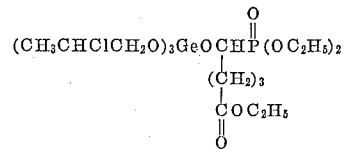

Example 12

To a reaction flask containing 19.4 g. (0.05 mole) of tris(2-chloropropoxy)chlorogermane there was added 8.3 g. (0.05 mole) of triethyl phosphite followed by the dropwise addition of p-anisaldehyde (6.8. g, 0.05 mole) while holding the temperature below 30° C. The reaction mixture was then heated to 73° C. for one hour and finally concentrated to 120° C. (0.8 mm.) to give 28.4 g. of [α-(diethoxyphosphinyl) - 4 - methoxybenzyl]tris(2 - chloropropyl)germanate,

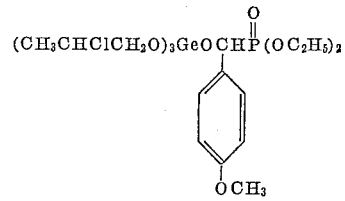

|  | Found | Anal. Calc'd for $C_{21}H_{36}Cl_3GeO_8P$ |
|---|---|---|
| Percent C | 40.97 | 40.35 |
| Percent H | 5.98 | 5.80 |
| Percent Ge | 11.46 | 11.60 |
| Percent P | 5.18 | 4.95 |

Example 13

This example illustrates some of the extensive variation which may be used to prepare a compound within the scope of the invention. In this example there is produced a compound having two different phosphinylhydrocarbyloxy radicals, carbon-germanium bonds, and an aliphatic hydrocarbyloxy linkage within the compound. This compound can be prepared as follows:

Diethyl phenylphosphonite (6.6 g., 0.033 mole) and freshly-distilled furfuraldehyde (3.2 g., 0.033 mole) were mixed at 0° C. under nitrogen. Trichlorophenylgermane (8.7 g., 0.033 mole) was immediately added dropwise while holding the temperature below 5° C. The mixture was allowed to warm slowly to room temperature and then heated to 70° C. for 0.5 hour. Triethyl phosphite (5.5 g., 0.033 mole) was added after cooling the mixture to near 0° C., and propionaldehyde (1.9 g., 0.033 mole) was added dropwise while holding this temperature. The mixture was allowed to stir at room temperature for a short time and then heated to 60° C. for 0.5 hour. The solution was cooled to 20° C. and then 4.0 g. (0.069 mole) of propylene oxide was added, and the solution was heated to reflux under a Dry Ice condenser for 1 hour. It was concentrated to 114° C. (0.6 mm.) to give 19.6 g. of [α-(ethoxyphenylphosphinyl)furfuryloxy][1 - (diethoxyphosphinyl)propoxy](2-chloropropoxy)phenylgermane.

We claim:

1. Compounds of the formula

wherein $n$ is a whole number of from 0 to 3, $m$ is a whole number of from 0 to 3, $x$ is a whole number from 1 to 4, and the sum total of $n+m+x$ is always equal to 4; R is selected from the group consisting of hydrogen, hydrocarbyl, halohydrocarbyl, hydrocarbyloxy, halohydrocarbyloxy, hydrocarbylthio, and halohydrocarbylthio radicals of from 1 to 20 carbon atoms, and two R radicals taken together stand for a member of the group consisting of a bivalent -hydrocarbylene- radical having from 4 to 6 carbons in the ring and a total of from 4 to 12 carbon atoms, and a bivalent -O-hydrocarbylene-O- radicals having from 2 to 4 carbon atoms in the ring and a total of from 2 to 12 carbon atoms; X is a member of the group consisting of bromine and chlorine; Y is selected from the group consisting of hydrogen, hydrocarbyl radicals of from 1 to 12 carbon atoms, furyl and thienyl radicals, and said radicals carrying a substituent selected from the group consisting of halogen, cyano-, -alkyl, -O-alkyl, -S-alkyl, -COO-alkyl, where alkyl has from 1 to 5 carbon atoms, when $n$ is 0 to 1, and when $n$ is 2 to 3, Y is selected from the group consisting of hydrogen, hydrocarbyl radicals of from 1 to 17 carbon atoms, furyl and thienyl radicals, and said radicals carrying a substituent selected from the group consisting of halogen, cyano-, -alkyl, -O-alkyl, -S-alkyl, -COO-alkyl, where alkyl has from 1 to 5 carbon atoms; and each A is selected from the group consisting of hydrocarbyl, hydrocarbyloxy, halohydrocarbyl, and halohydrocarbyloxy radicals which contain from 1 to 20 carbon atoms each.

2. Tetrakis[1 - (diethoxyphosphinyl)propyl]germanate having the formula

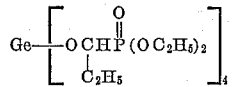

3. Tris[1 - (diethoxyphosphinyl)ethoxy]phenylgermane having the formula

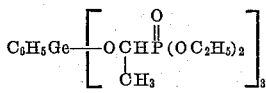

4. [α - (Dimethoxyphosphinyl)-2-chlorobenzyl]tris(2-chloropropyl)germanate having the formula

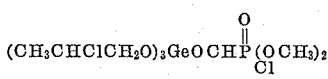

5. [1 - (dihexyloxyphosphinyl) - 2 - propenyl]tris(2-chloropropyl)germanate having the formula

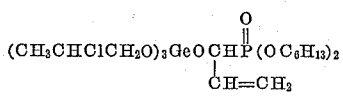

6. [α-(Ethoxyphenylphosphinyl)furfuryl][1-(diethoxyphosphinyl)propoxy](2 - chloropropoxy)phenylgermane having the structure

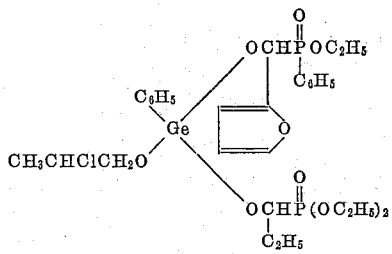

7. The method which comprises contacting and reacting a halogermanium compound of the formula $$R_nGeX_{(4-n)}$$

where $n$ is a whole number of from 0 to 3, X is a member of the group consisting of bromine and chlorine, R is selected from the group consisting of hydrogen, and hydrocarbyl, halohydrocarbyl, hydrocarbyloxy, halohydrocarbyloxy, hydrocarbylthio, and halohydrocarbylthio radicals wherein the hydrocarbyl group has from 1 to 20 carbon atoms, and wherein two R radicals taken together stand for a member of the group consisting of a bivalent -hydrocarbylene- radical having from 4 to 6 carbons in the ring and a total of from 4 to 12 carbon atoms, and a bivalent -O-hydrocarbylene-O- radical having from 2 to 4 carbon atoms in the ring and a total of from 2 to 12 carbon atoms, with a carbonyl compound of the formula, YCHO, wherein Y is selected from the group consisting of hydrogen, and hydrocarbyl radicals of from 1 to 12 carbon atoms, furyl, thienyl, and said radicals carrying a substituent selected from the group consisting of halogen, cyano-, -alkyl, -O-alkyl, -S-alkyl, -COO-alkyl, where alkyl has from 1 to 5 carbon atoms, when $n$ is 0 to 1, and when $n$ is 2 to 3, Y is selected from the group consisting of hydrogen, and hydrocarbyl radicals of from 1 to 17 carbon atoms, furyl and thienyl, and said radicals carrying a substituent selected from the group consisting of halogen, cyano, -alkyl, -O-alkyl, -S-alkyl, -COO-alkyl, where alkyl has from 1 to 5 carbon atoms; and a trivalent phosphorus ester of the formula $A_2POT$, in which T is selected from the group consisting of alkyl and haloalkyl radicals of from 1 to 20 carbon atoms, and each A is selected from the group consisting of hydrocarbyl, hydrocarbyloxy, halohydrocarbyl, and halohydrocarbyloxy radicals which contain from 1 to 20 carbon atoms each.

8. The method which comprises reacting germanium tetrachloride, propionaldehyde, and triethyl phosphite and recovering from the resulting reaction mixture tetrakis[1-(diethoxyphosphinyl)propyl]germanate.

9. The process which comprises reacting (2-chloropropoxy)trichlorogermane, benzaldehyde, and triethyl phosphite and recovering from the resulting reaction mixture tris [α - (diethoxyphosphinyl)benzyl](2 - chloropropoxy)germanate.

10. The process which comprises reacting germanium tetrachloride, heptaldehyde, and tris(2-chloroethyl)phosphite and recovering from the resulting reaction mixture {1-[bis(2 - chloroethoxy)phosphinyl]heptyloxy}trichlorogermane.

11. The method which comprises contacting and reacting a halogermanium compound of the formula $$R_nGeX_{(4-n)}$$

wherein $n$ is a whole number of from 0 to 3, X is a member of the group consisting of bromine and chlorine, R is selected from the group consisting of hydrogen, and hydrocarbyl, halohydrocarbyl, hydrocarbyloxy, halohydrocarbyloxy, hydrocarbylthio, and halohydrocarbylthio radicals wherein the hydrocarbyl group has from 1 to 20 carbon atoms, and wherein two R radicals taken together stand for a member of the group consisting of a bivalent -hydrocarbylene- radical having from 4 to 6 carbon atoms in the ring and a total of from 4 to 12 carbon atoms, and a bivalent -O-hydrocarbylene-O- radical having from 2 to 4 carbon atoms in the ring and a total of from 2 to 12 carbon atoms, with an α-hydroxypentavalent phosphorus compound of the formula

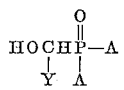

wherein Y is selected from the group consisting of hydrogen, and hydrocarbyl radicals of from 1 to 12 carbon atoms, furyl, thienyl, and said radicals carrying a substituent selected from the group consisting of halogen, cyano-, -alkyl, -O-alkyl, -S-alkyl, -CCO-alkyl, where alkyl has from 1 to 5 carbon atoms, when $n$ is 0 to 1, and when $n$ is 2 to 3, Y is selected from the group consisting of hydrogen, and hydrocarbyl radicals of from 1 to 17 carbon atoms, furyl, thienyl radicals, and said radicals consisting of halogen, cyano, -alkyl, -O-alkyl, -S-alkyl, and -COO-alkyl where alkyl has from 1 to 5 carbon atoms; and each A is selected from the group consisting of hydrocarbyl, halohydrocarbyl, hydrocarbyloxy, and halohydrocarbyloxy radicals having from 1 to 20 carbon atoms.

12. A dialkyloxyphosphinylalkyl germanate ester having at least one ester group which is a dialkyloxyphosphinylalkyl group, having from 1 to 20 carbon atoms in each alkyloxy group bonded to phosphorus and from 1 to 18 carbon atoms in the alkyl group, any remaining germanium valences not satisfied with a dialkyloxyphosphinylalkyl ester group being satisfied with a haloalkyloxy group selected from the group consisting of chlorine substituted and bromine substituted alkyloxy groups having from 1 to 20 carbon atoms.

13. A dialkyloxyphosphinylalkyl tris(haloalkyl)germanate ester having from 1 to 20 carbon atoms in each alkyloxy group bonded to the phosphorus, from 1 to 18 carbon atoms in the alkyl group, from 1 to 20 carbon atoms in each haloalkyl group wherein the halogen thereof is selected from the group consisting of chlorine and bromine.

14. The method for preparing a dialkyloxyphosphinylalkyl germanium ester which comprises contacting and reacting a germanium tetrahalide selected from the group consisting of germanium tetrachloride and germanium tetrabromide with about one molar equivalent of an alkanecarboxaldehyde having from 1 to 18 carbon atoms and about one molar equivalent of a trialkyl phosphite having from 1 to 20 carbon atoms in each alkyl group for each halogen which is to be replaced from the germanium tetrahalide.

15. A process for preparing a dialkoxyphosphinylalkyl tris(haloalkyl)germanate ester which comprises contacting and reacting a tris(haloalkyloxy)germanium halide selected from the group consisting of a tris(chloroalkyloxy)germanium chloride and a tris(bromoalkyloxy)germanium bromide having from 1 to 20 carbon atoms in each haloalkyl group with an alkanecarboxaldehyde and a trialkyl phosphite.

References Cited by the Examiner

Fieser: Organic Chemistry, third edition, 1956, pages 46–7.

Allott: Richter's Organic Chemistry, third edition, vol. 1 (1934), pages 114–18 and 578.

Taylor: Richter's Organic Chemistry, third edition, vol. 2 (1934), pages 77, 93, 96, 177–79, 289 and 348.

Bergmann: Chem. of Acetylene and Related Compounds, Interscience, 1948, page 80.

IRVING MARCUS, *Primary Examiner.*

H. J. LIDOFF, WALTER A. MODANCE, *Examiners.*